United States Patent
Radionov et al.

(10) Patent No.: US 7,526,019 B1
(45) Date of Patent: Apr. 28, 2009

(54) METHOD AND SYSTEM FOR PROVIDING MULTI-CHANNEL MULTIMODE QAM EQUALIZATION AND CARRIER RECOVERY

(75) Inventors: Vladimir Radionov, San Ramon, CA (US); Bin-Fan Liu, Livermore, CA (US); Yu Kou, San Jose, CA (US)

(73) Assignee: Broadlogic Network Technologies Inc., San Jose, CA (US)

( * ) Notice: Subject to any disclaimer, the term of this patent is extended or adjusted under 35 U.S.C. 154(b) by 512 days.

(21) Appl. No.: 10/402,368

(22) Filed: Mar. 27, 2003

(51) Int. Cl.
*H03H 7/30* (2006.01)
*H03K 5/159* (2006.01)

(52) U.S. Cl. .................. 375/229; 375/230; 375/231; 375/232; 375/233; 375/234; 375/235; 375/236

(58) Field of Classification Search .......... 375/229–375
See application file for complete search history.

(56) References Cited

U.S. PATENT DOCUMENTS

| | | | | |
|---|---|---|---|---|
| 4,633,485 A | * | 12/1986 | Betts et al. | 375/346 |
| 5,311,546 A | * | 5/1994 | Paik et al. | 375/232 |
| 5,499,268 A | * | 3/1996 | Takahashi | 375/231 |
| 6,418,164 B1 | * | 7/2002 | Endres et al. | 375/232 |
| 6,668,014 B1 | * | 12/2003 | Endres et al. | 375/232 |
| 7,006,565 B1 | * | 2/2006 | Endres et al. | 375/233 |
| 7,031,405 B1 | * | 4/2006 | Touzni et al. | 375/326 |
| 2004/0120422 A1 | * | 6/2004 | Lin et al. | 375/316 |
| 2005/0002474 A1 | * | 1/2005 | Limberg | 375/321 |

* cited by examiner

*Primary Examiner*—Chieh M Fan
*Assistant Examiner*—Jason M. Perilla
(74) *Attorney, Agent, or Firm*—Townsend and Townsend and Crew LLP

(57) ABSTRACT

A system for providing multi-channel multi-mode QAM equalization and carrier recovery is provided. According to one exemplary embodiment, the system includes an equalization circuit and a carrier recovery circuit operating in a concurrent manner to provide equalization and carrier recovery. The equalization circuit and the carrier recovery circuit each have two operating modes, namely, an acquisition mode and a tracking mode. The carrier recovery circuit evaluates a phase detection error calculated based on signals obtained from the equalization circuit. Based on the evaluation of the phase detection error, the equalization circuit and the carrier recovery circuit are respectively directed to switch operating mode, if appropriate.

33 Claims, 9 Drawing Sheets

| Demod. Mode objective | Initial ISI reduction & Initial carrier lock | Additional ISI and phase error reduction to switch EQ to DD mode | Further ISI reduction to switch PD to DD mode | Final convergence & tracking |
|---|---|---|---|---|
| EQ Mode | | Blind IIR | Large step DFE | Small step DFE |
| CR Mode | Coarse polarity-based PLL | Accurate polarity-based PLL | | Decision-directed PLL |
| Error tracking | | N/A | Decision error power tracking | |
| Mode switch criterion | PD error < thresh. 1 | PD error < thresh. 2 | PD error < thresh. 3 | Error power < Thresh. |
| FEC | N/A | | | FEC active |

Fig. 2

| QAM order | Equalizer output power $E\{|x_i|^2\} = \dfrac{E\{|a_i|^2\}}{\beta^2}$ | CMA radius $\gamma = \dfrac{1}{\beta^2}\dfrac{E\{|a_i|^4\}}{E\{|a_i|^2\}}$ | Pre-slicer scaling factor $\beta$ |
|---|---|---|---|
| 16 | 0.625 | 0.825 | $2^2$ |
| 32 | 0.313 | 0.409 | $2^3$ |
| 64 | 0.656 | 0.906 | $2^3$ |
| 128 | 0.320 | 0.430 | $2^4$ |
| 256 | 0.664 | 0.927 | $2^4$ |

Fig. 5

METHOD AND SYSTEM FOR PROVIDING MULTI-CHANNEL MULTIMODE QAM EQUALIZATION AND CARRIER RECOVERY

BACKGROUND OF THE INVENTION

The present invention generally relates to digital demodulation of Quadrature Amplitude Modulated (QAM) signals in multiple channels and, more specifically, to a method and system for providing digital adaptive equalization and carrier recovery for multi-channel QAM demodulators.

In a digital cable broadcast system, a transmitted signal often experiences time dispersion due to echoes in the channel impulse response. This dispersion causes deviation from the ideal channel characteristics of a constant amplitude and linear phase (constant delay) response. As a result, this dispersion degrades the quality of the received signal. In turn, the degraded quality of the received signal affects the accuracy of signal detection.

Hence, it would be desirable to provide a method and system that can be used to achieve optimal demodulation of received signals.

BRIEF SUMMARY OF THE INVENTION

A method and system for providing multi-channel multimode QAM equalization and carrier recovery is provided. According to one exemplary embodiment, the system includes an equalization circuit and a carrier recovery circuit operating in a concurrent manner to provide equalization and carrier recovery. The equalization circuit and the carrier recovery circuit each have two operating modes, namely, an acquisition mode and a tracking mode. The carrier recovery circuit evaluates a phase detection error calculated based on signals obtained from the equalization circuit. Based on the evaluation of the phase detection error, the equalization circuit and the carrier recovery circuit are respectively directed to switch operating mode, if appropriate.

The present invention as described herein offers a number of benefits and advantages. For example, the present invention can be used to provide adaptive filtering and deployed in a receiver system to compensate for non-ideal channel characteristics and achieve optimal demodulation of a digital cable broadcast signal. Also, by correcting the amplitude and phase response of a received signal, the present invention minimizes the inter-symbol interference (ISI) of the received signal, thus improving signal detection accuracy.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 2 is a table summarizing the various operating mode transitions according to one exemplary embodiment of the present invention;

FIG. 5 is a table summarizing the various values that can be used for CMA radius $\gamma$ according to type of QAM modulation;

DETAILED DESCRIPTION OF THE INVENTION

Figure 1:
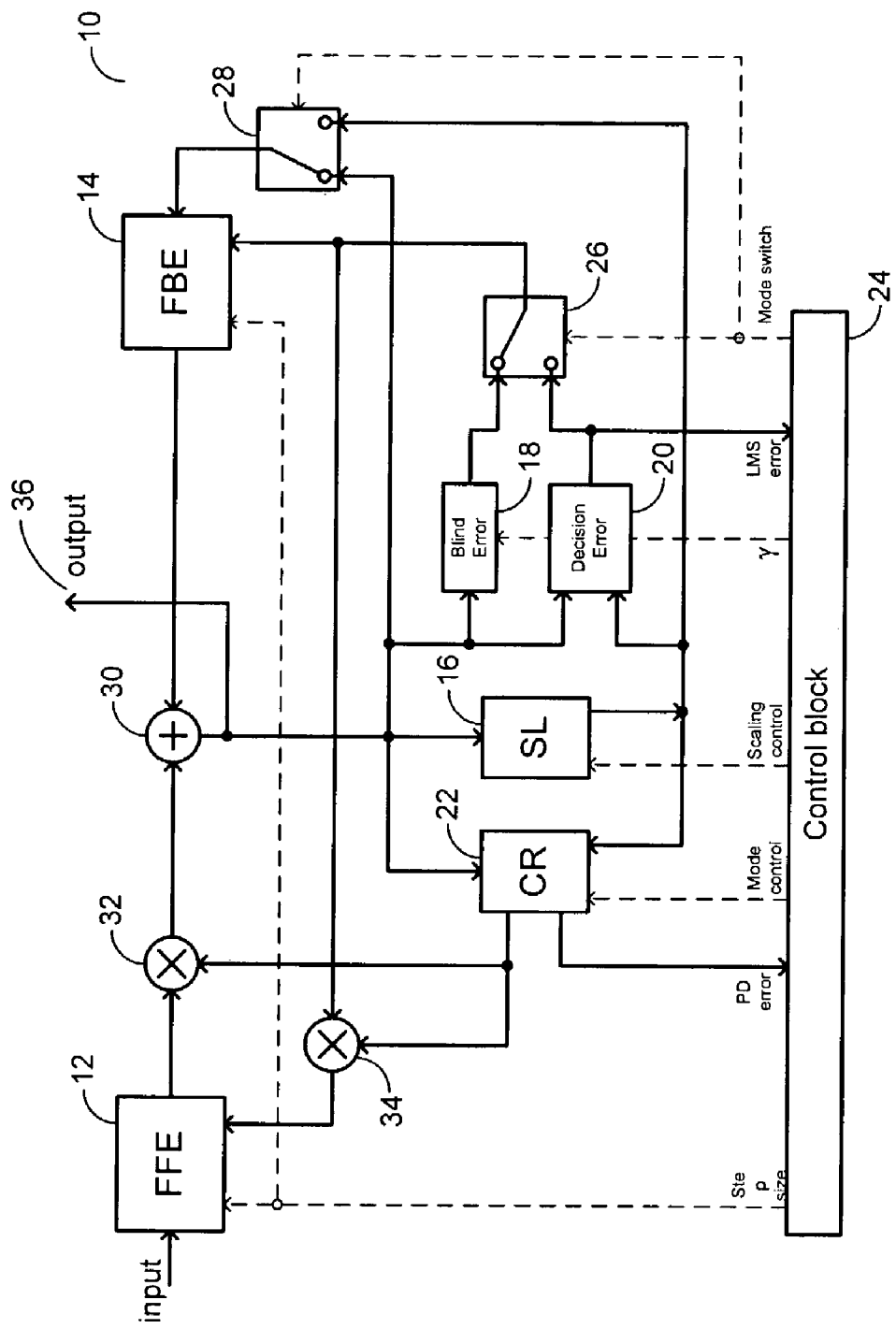
FIG. 1 is a simplified schematic diagram illustrating an exemplary embodiment of the present invention.

The present invention in the form of one or more exemplary embodiments will now be described. According to one exemplary embodiment of the present invention, a circuit is provided to remove inter-symbol interference (ISI) and the frequency offset in a received signal. The circuit can be incorporated as part of a demodulator or implemented as a separate module which works in cooperation with the demodulator to achieve its intended functions, as will be further described below. FIG. 1 is a simplified schematic diagram illustrating an exemplary embodiment of the present invention. This exemplary embodiment is illustrated in the form of a circuit 10. As shown in FIG. 1, the circuit 10 has a number of components including a feed-forward filter 12, a feedback filter 14, a slicer 16, a blind error estimation module 18, a decision error estimation module 20, a carrier recovery module 22, a control module 24, an error path switch 26, a data path switch 28, a complex data adder 30, a data de-rotator (complex multiplier) 32, and an error re-rotator (complex multiplier) 34. In one exemplary implementation, in order to minimize equalizer throughput, both the feed-forward filter 12 and the feedback filter 14 are transpose form finite impulse response (FIR) filters.

The circuit 10 has a number of exemplary features and characteristics. For example, the circuit 10 as shown in FIG. 1 is capable of performing joint equalization and carrier recovery. When performing joint equalization and carrier recovery, the circuit 10 is capable of engaging in one of two operating modes, namely, an acquisition mode and a tracking mode. In the acquisition mode, the Constant Modulus Algorithm (CMA) is used for filter adaptation and polarity-based phase detector is used for carrier recovery. In the tracking mode, the Least Mean Square Algorithm (LMS) is used for filter adaptation and decision-based phase detector is used for carrier tracking. In order to eliminate complex multiplication operations for weight update in the two stochastic gradient algorithms (CMA and LMS) mentioned above and to preserve relatively high convergence rate, both data and error are approximated by a power of two (2), i.e., both data and error are represented as binary floating point numbers with a 1-bit mantissa. As will be further described below, the switch between the two operating modes is accomplished based on analysis of the phase detector error level.

As mentioned above, the circuit 10 is capable of performing equalization and carrier recovery at the same time. Equalization is performed collectively by the following components: the feed-forward filter 12, the feedback filter 14, the slicer 16, either the blind error estimation module 18 or the decision error estimation module 20 (depending on the current mode), and the complex data adder 30. These components are collectively referred to as the "Equalization Circuit".

The blind error estimation module 18 is activated during the acquisition mode and is used to compute a CMA error, which is fed back to the filters 12, 14 in order to update coefficients according to the CMA.

The slicer 16 snaps the output of the complex data adder 30 to the predetermined QAM constellation points, thus providing "hard decisions" on the received symbols.

The decision error estimation module 20 is activated during the tracking mode and computes a decision error, which is fed back to the filters 12, 14 in order to update coefficients according to LMS algorithm.

Carrier recovery is performed collectively by the following components: the slicer 16, the carrier recovery module 22, the data de-rotator (complex multiplier) 32, and the error re-rotator (complex multiplier) 34. These components are collectively referred to as the "Carrier Recovery Circuit". The Equalization Circuit and the Carrier Recovery Circuit operate in parallel in a concurrent manner to achieve their respective functions. The Equalization Circuit and the Carrier Recovery Circuit both have two operating modes, namely, an acquisition mode and a tracking mode. As will be further described below, for both the Equalization Circuit and the Carrier Recovery Circuit, the switch between the acquisition mode and the tracking mode is governed by the control module 24 based on the analysis of the phase detection error. Phase detection is performed on the input and output of the slicer 16. Phase detection is used to monitor various predetermined thresholds. In one exemplary embodiment, a first predetermined threshold $\epsilon_{th1}$, a second predetermined threshold $\epsilon_{th2}$ and a third predetermined threshold $\epsilon_{th3}$ are monitored. These thresholds are used to control the transition or switch from one operating mode to another. When each of these thresholds is reached, either the Equalization Circuit or the Carrier Recovery Circuit or both is directed to switch operating modes. Based on the disclosure and teachings provided herein, a person of ordinary skill in the art will appreciate how to select the appropriate predetermined thresholds.

When the circuit 10 is first powered up, the Equalization Circuit engages in the acquisition mode. When in the acquisition mode, the Equalization Circuit assumes the architecture of an infinite impulse response (IIR) filter. The coefficients of the IIR filter are adapted based on the CMA. As will be further described below, the adaptation of the coefficients is performed progressively in a linearly delayed manner. At this point, the Equalization Circuit provides initial ISI reduction. When in the acquisition mode, the Equalization Circuit also serves a number of other functions including, for example, adjusting the power of the signal to the level of ideal QAM constellation in order to match the slicer decision levels, reducing ISI to a sufficient level to allow the Carrier Recovery Circuit to achieve an initial lock on the carrier offset frequency, and initializing respective coefficients of the feed-forward filter 12 and the feedback filter 14 in order to provide a relatively low symbol error rate before switching to the decision-directed (tracking) mode. When the phase detection error $\epsilon_{PD}$ becomes less than the second predetermined threshold $\epsilon_{th2}$, the Equalization Circuit transitions from the acquisition mode to the tracking mode. When in the tracking mode, the Equalization Circuit assumes the architecture of a decision-feedback equalizer (DFE) with the coefficients adapted by the LMS algorithm with a relatively large step size. Similarly, the adaptation of the coefficients is also performed progressively in a linearly delayed manner. More specifically, the switch 28 converts the IIR architecture to the DFE architecture by inserting the slicer 16 between the output 36 of the Equalization Circuit and the input of the feedback filter 14. During the tracking mode, further ISI reduction is performed. Subsequently, when the phase detection error $\epsilon_{PD}$ becomes less than the third predetermined threshold $\epsilon_{th3}$, the Equalization Circuit switches to a step size with a smaller value in order to provide a trade-off between tracking capabilities and adaptation noise level. A person of ordinary skill in the art will appreciate how to select the appropriate step size for use by the Equalization Circuit in the tracking mode.

Concurrently, when the circuit 10 is powered up, the Carrier Recovery Circuit also engages in the acquisition mode. When in the acquisition mode, the Carrier Recovery Circuit uses a polarity-based phase detector to measure the angular speed of rotation of the corners of a QAM constellation. The phase detection error is measured as follows:

$$\varepsilon_{PD} = \begin{cases} imag[Zsign(Z^*)], & |Z| \geq Z_{th} \\ 0, & |Z| \leq Z_{th} \end{cases}$$

In one exemplary embodiment, the polarity-based phase detector is implemented with a phase lock loop (PLL). When the phase detection error EPD becomes less than the first predetermined threshold $\epsilon_{th1}$, the Carrier Recovery Circuit adjusts the PLL to a lower loop gain in order to perform more accurate phase tracking. When the phase detection error $\epsilon_{PD}$ becomes less than the third predetermined threshold $\epsilon_{th3}$, the Carrier Recovery Circuit transitions from the acquisition mode to the tracking mode. When in the tracking mode, the Carrier Recovery Circuit uses a decision-directed phase detector according to the following expression:

$$\epsilon_{PD} = imag[ZA^*]$$

where Z is the output of the Equalization Circuit and A is the output of the slicer 16.

Furthermore, when the phase detection error $\epsilon_{PD}$ becomes less than the second predetermined threshold $\epsilon_{th2}$, the control module 24 begins to track the power of the decision error as follows:

$$P(n) = (1-\lambda)P(n-1) + \lambda|Z(n) - A(n)|^2$$

When the phase detection error $\epsilon_{PD}$ becomes less than the third predetermined threshold $\epsilon_{th3}$, the decision error power is further monitored. When the decision error power P(n) falls below a predetermined power threshold $P_{th}$, forward error correction (not shown) is activated and a demodulator working in cooperation with the circuit 10 can engage in an operating mode. FIG. 2 is a table summarizing the various operating mode transitions according to one exemplary embodiment of the present invention.

Figure 8:
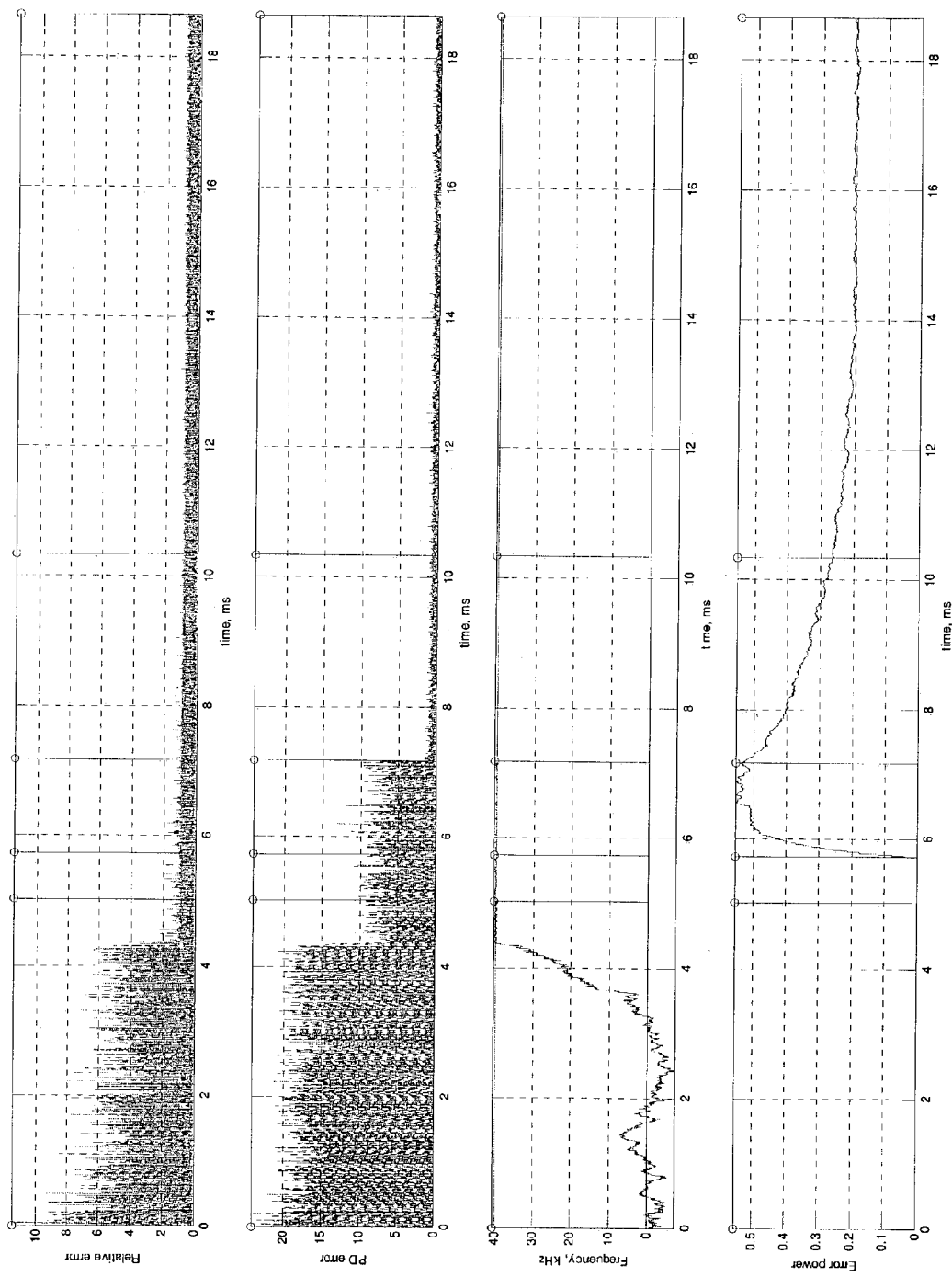
FIG. 8 is a number of parameter history diagrams illustrating a number of indicative parameters of one exemplary embodiment during the acquisition and tracking modes according to the present invention.
Figure 9:
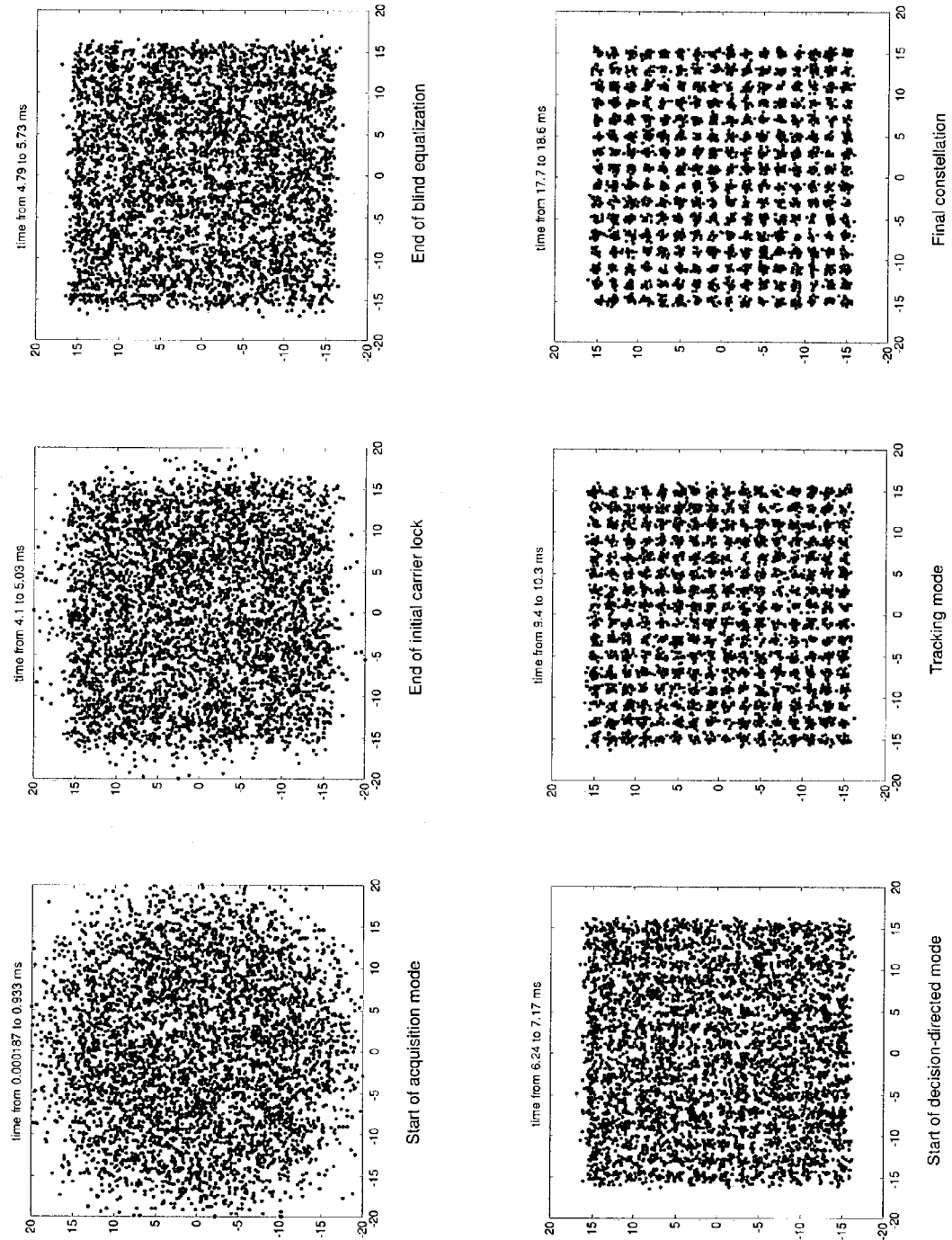
FIG. 9 is a number of illustrative scattering diagrams showing the output of one exemplary embodiment at various stages according to the present invention.

FIG. 8 illustrates a number of indicative parameters of the circuit 10 during the acquisition and tracking modes. FIG. 9 is a series of illustrative scattering diagrams showing the output of the Equalization Circuit at various progressive stages.

Figure 3:
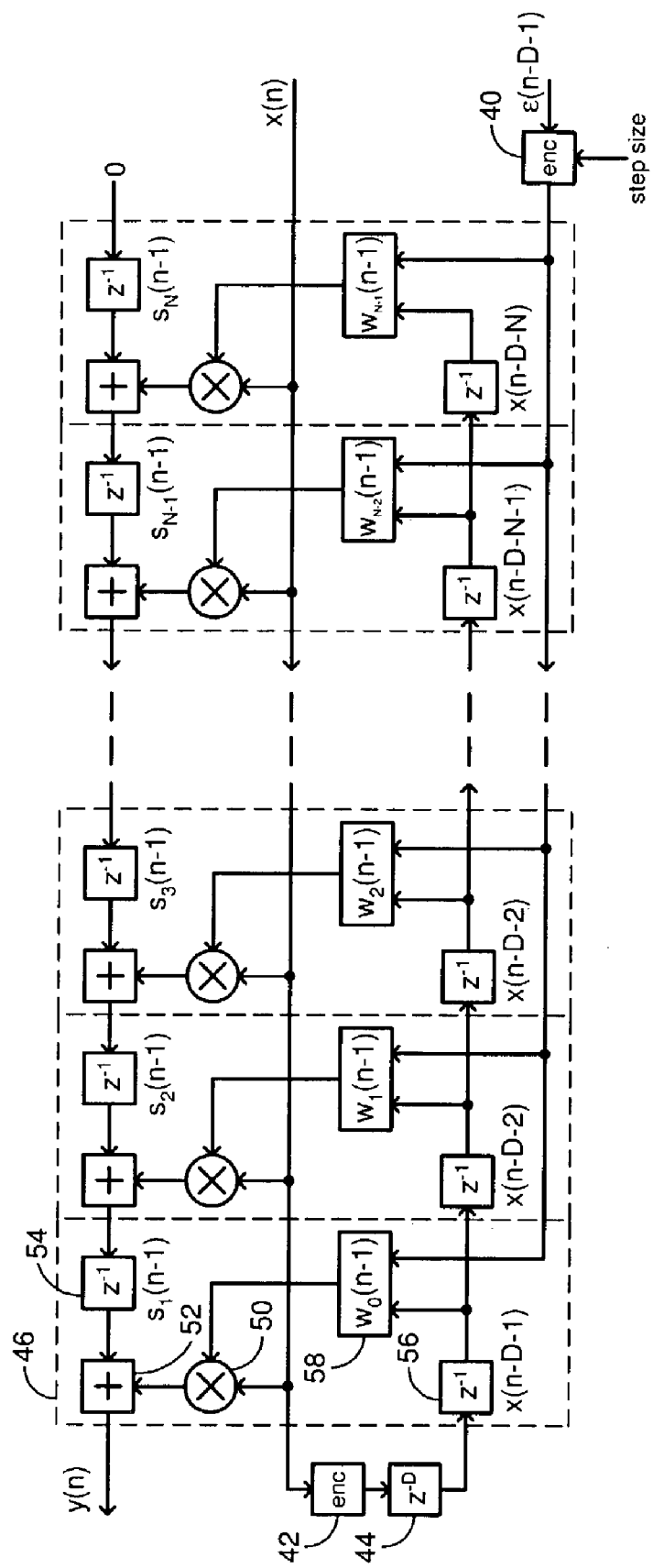
FIG. 3 is a simplified schematic diagram illustrating an exemplary embodiment of an adaptive filter in accordance with the present invention.

Exemplary embodiments of various components of the circuit 10 are further described below. FIG. 3 is a simplified schematic diagram illustrating an exemplary embodiment of an adaptive FIR filter that can be used as the feed-forward filter 12 and the feedback filter 14. In order to minimize filter throughput, both filters 12 and 14 are implemented in the transpose form. In one exemplary embodiment, the adaptive FIR filter comprises N identical first order modules 46, an error encoder 40, a data encoder 42, and a delay module 44.

Each first order module 46 comprises a complex multiplier 50, a complex adder 52, a data and an error delay modules 54 and 56, and a coefficient update block 58. The output of the adaptive FIR filter is calculated as follows:

$$y(n) = s_1(n-1) + w_0(n-1)x(n),$$

$$s_i(n) = s_{i+1}(n-1) + w_i(n-1)x(n), i=1 \ldots N-1,$$

where N is the number of taps. The output of the transpose for the filter can be expressed in the equivalent transversal form as follows:

$$y(n) = \sum_{i=0}^{N-1} w_i(n-i-1)x(n-i)$$

Coefficients of the filter are updated in the coefficient update block 58 according to the following expression:

$$w_i(n) = w_i(n-1) + \epsilon(n-D-1)x^*(n-D-i-1), i=0 \ldots N-1 \qquad \text{Eq. (1)}$$

where D is a hardware-introduced delay in error calculation, and an adaptation step size $\mu$ is included in the error value $\epsilon$. Typically, D<<N. An equivalent transversal filter can be expressed as follows:

$$y(n) = \sum_{i=0}^{N-1} a_i(n-1)x(n-i)$$

An expression for coefficient update can be rewritten in the following manner:

$$a_i(n) = a(n-1) + \epsilon(n-D-i-1)x^*(n-D-2i-1), i=0 \ldots N-1$$

It can be seen from the expression above that the present invention, unlike well known regular LMS and delayed LMS algorithms, uses a linearly delayed coefficient adaptation scheme, i.e., coefficients are progressively adapted in a linearly delayed manner. While providing convergence speed somewhere between the regular and delayed LMS versions, the present approach allows for reduction of hardware complexity which would have been typical for delayed LMS used for adaptation of transpose form FIR filters.

In an exemplary embodiment, in order to further reduce the computational complexity of coefficient updates, Eq. (1) is replaced by its approximated form:

Eq. (2a):

$$w_i^I(n) = w_i^I(n-1) + \begin{cases} \varepsilon^I(n-D-1)x^I(n-D-i-1), & |\varepsilon^I(\ldots)x^I(\ldots)| \geq |\varepsilon^Q(\ldots)x^Q(\ldots)| \\ \varepsilon^Q(n-D-1)x^Q(n-D-i-1), & \text{otherwise} \end{cases}$$

and

Eq. (2b):

$$w_i^Q(n) = w_i^Q(n-1) + \begin{cases} \varepsilon^Q(n-D-1)x^I(n-D-i-1), & |\varepsilon^Q(\ldots)x^I(\ldots)| \geq |\varepsilon^I(\ldots)x^Q(\ldots)| \\ -\varepsilon^I(n-D-1)x^Q(n-D-i-1), & \text{otherwise} \end{cases}$$

where superscripts I and Q denote real and imaginary components respectively for the related complex values w, $\epsilon$, and x. As shown in Eqs. (2a) and (2b), the current weight of a coefficient is computed based on its previous weight adjusted by either one of two updating terms. Whichever updating term having a larger magnitude is selected for use in adjusting the current weight.

In one exemplary embodiment, the feed-forward filter 12 is a 12-tap FIR filter. The weight is in Q2.10 format and the data is in Q1.11 format. The coefficients $W_0$-$W_{11}$ are updated based on the encoded data and error. As shown in FIG. 3, the encoded data and error are provided by a data encoder 40 and an error encoder 42 respectively. The data encoder 40 and the error encoder 42 will be further described below. Internally, the coefficients are 24-bit and the twelve (12) most significant bits (MSBs) are provided to the multiplier. There is a fourteen (14) symbol time delay for the encoded data because there are two (2) extra delays introduced in the loop in order to reduce the time constraints on implementation.

In one exemplary implementation, the feedback filter 14 has a similar structure as that of the feed-forward filter 12 as shown in FIG. 3. The feedback filter 14 is a 24-tap FIR filter. The weight is in Q2.10 format and the part of filter output used here is in Q3.9 format. The coefficients $V_0$-$V_{23}$ are updated based on the encoded equalizer output and error. Internally, these coefficients are 24-bit and the twelve (12) MSB's are provided to the multiplier. There is a twenty-four (24) symbol time delay for the encoded filter output.

The data encoder 40 encodes the 12-bit data from timing recovery into the following format: $[d_4 d_3 d_2 d_1 d_0]$. The bit $d_4$ is the sign of the data. This bit $d_4$ has a logical value of "1" when the data is negative and "0" otherwise. The bits $[d_3 d_2 d_1 d_0]$ contain the position of the most significant bit relative to the radix point in the 12-bit data and they can be determined by the position of the first "1" in a positive number or the first "0" in a negative number. Because the data is supposed to be in Q1.11 format, the decimal value for $[d_3 d_2 d_1 d_0]$ ranges from [0,10]. For example, (Q1.11) 0.01101101011 is represented as [00001]. If the input data is "0" or "−", then $[d_4 d_3 d_2 d_1 d_0]$ is equal to [01111]. Because the data to the feedback filter 14 is in Q3.9 format, the resultant data should be adjusted by "−2".

The error encoder 42 encodes the 16-bit data from the CMA or LMS into the following format: $[e_5 e_4 e_3 e_2 e_1 e_0]$. The bit $e_5$ is the sign of the data. This bit $e_5$ has a logical value of "1" when the data is negative and "0" otherwise. The bits $[e_4 e_3 e_2 e_1 e_0]$ contain the position of the most significant bit relative to the radix point in the fix-point data and they can be determined by the position of the first "1" in a positive number or the first "0" in a negative number. Because the data is supposed to be in Q1.15 format, the decimal value for $[e_4 e_3 e_2 e_1 e_0]$ ranges from $[\mu, \mu+14]$, where $\mu$ is the step size. If the error data is "0" or "−1", then $[e_5 e_4 e_3 e_2 e_1 e_0]$ is represented by [011111].

Figure 4:
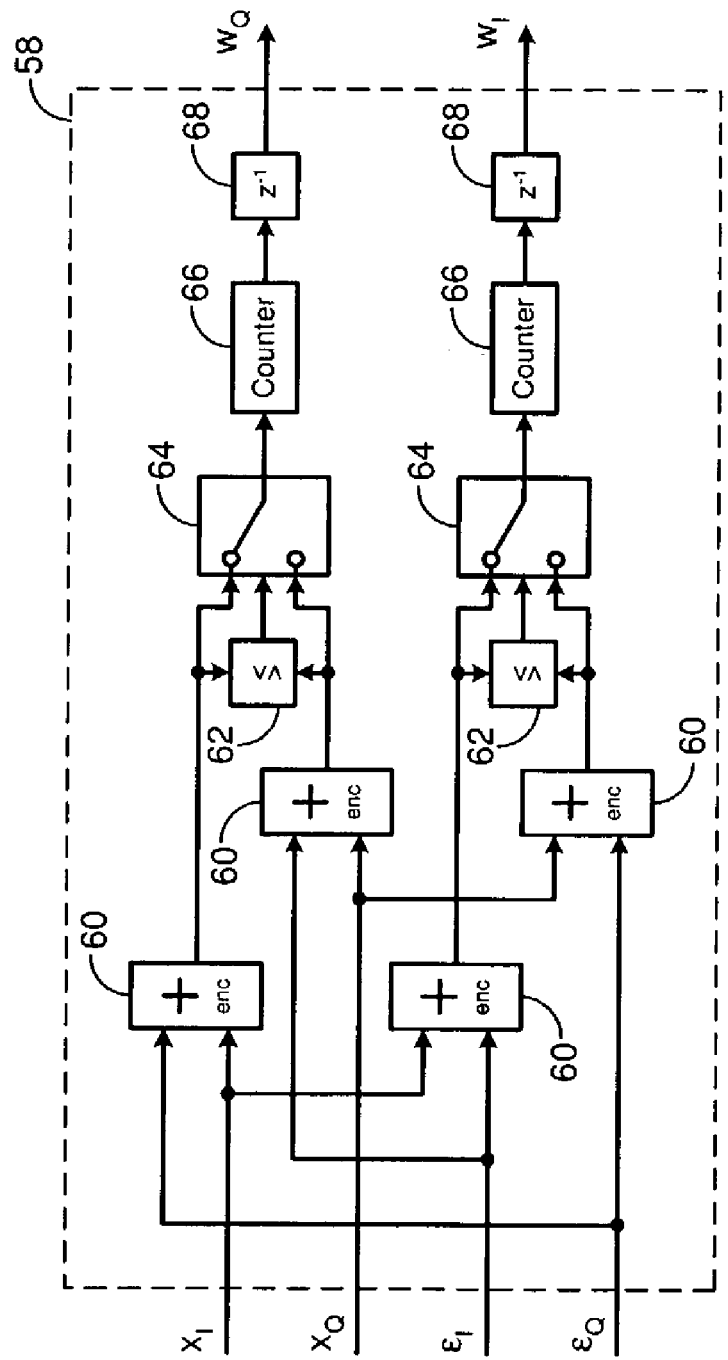
FIG. 4 is a simplified schematic diagram illustrating an implementation of the coefficient update block according to one exemplary embodiment of the present invention.

FIG. 4 is a simplified schematic diagram illustrating an implementation of the coefficient update block 58 according to one exemplary embodiment of the present invention. The coefficients of the feed-forward filter 12 and the feedback filter 14 are updated according to Eq. (2a) described above. To simplify the circuit, the error and input data are in encoded form. The coefficient W(n) is represented by two (I and Q) 24-bit counters internally. For the I channel counter, Eq. (2a) is further simplified into the following form:

$$Counter_I = Counter_I + (-1)^{xor(d_4^I, e_5^I)} 2^{\max\{23-[d_3^I d_2^I d_1^I d_0^I]+[e_4^I e_3^I e_2^I e_1^I e_0^I], 0\}} +$$
$$(-1)^{notxor(d_4^I, e_5^I)} 2^{\max\{23-[d_3^Q d_2^Q d_1^Q d_0^Q]+[e_4^Q e_3^Q e_2^Q e_1^Q e_0^Q], 0\}},$$

where $d_i^I$, for i={0,1,2,3,4}, are encoded data for I channel, and $e_i^I$, for i={0,1,2,3,4,5}, are encoded error data for I channel, and similarly for Q channel. For the Q channel counter, Eq. (2b) is simplified into the following form:

$$Counter_Q = Counter_Q + (-1)^{xor(d_4^I, e_5^Q)} 2^{\max\{23-[d_3^I d_2^I d_1^I d_0^I]+[e_4^Q e_3^Q e_2^Q e_1^Q e_0^Q], 0\}} +$$
$$(-1)^{xor(d_4^Q, e_5^I)} 2^{\max\{23-[d_3^Q d_2^Q d_1^Q d_0^Q]+[e_4^I e_3^I e_2^I e_1^I e_0^I], 0\}}.$$

As output, the twelve (12) MSB's are taken to perform the multiplication with the input data. This coefficient is in the Q2.10 format.

Referring to FIG. 4, four partial sums ([$d_3$ $d_2 d_1 d_0$]+[$e_4 e_3 e_2 e_1 e_0$]) computations and a sign bit comparison are collectively performed in adders 60. Comparators 62 are then respectively used to choose the appropriate partial sum to control counters 66. The registers 68 are used to store truncated result of the previous counter update.

Depending on the current mode of the Equalization Circuit, either the blind error estimation block 18 or the decision error estimation block 20 is used to compute adaptation error $\epsilon$. The CMA error defined as follows:

$$\epsilon = \mu_{CMA} Z(\gamma - |Z|^2),$$

where $\mu_{CMA}$ is a step size, Z is a soft output of the Equalization Circuit, and $\gamma$ is a CMA radius. Parameter $\gamma$ is a precomputed reference value which defines a level of the Equalization Circuit output 36. To avoid additional scaling of the output signal before the slicer 16, the value of the CMA radius is chosen in a such way that the necessary scaling factor would be equal to a power of two, while providing a minimum difference between output power levels amongst different types of modulation (see FIG. 5).

LMS error is defined as:

$$\epsilon = \mu_{LMS}(A - Z),$$

where $\mu_{LMS}$ is the step size, A is the output of the slicer 16 and Z is the output of Equalization Circuit. Because both Z and A are in Q3.13 format, A-Z is also in this format (assuming no overflow occurs).

Figure 6:
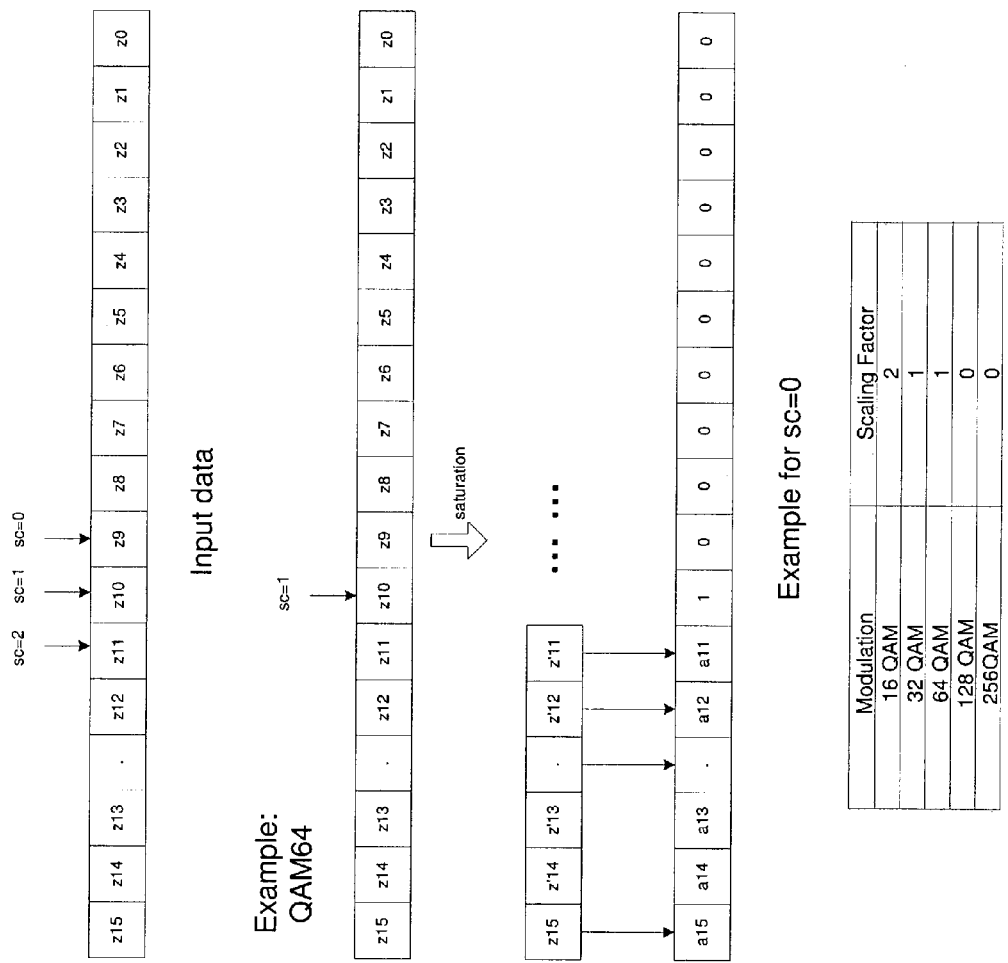
FIG. 6 is a simplified schematic diagram showing an architecture of the slicer according to one exemplary embodiment of the present invention.

The function of slicer 16 is to snap the data point to the constellation. The slicer 16 takes the output Z of the Equalization Circuit and delivers the nearest point (A) in the constellation as output. FIG. 6 is a simplified schematic diagram showing an architecture of the slicer 16 according to one exemplary embodiment of the present invention. According one exemplary embodiment, the slicing scheme used by the slicer 16 is based on properties of the 2's complement arithmetic. Combinations of bits are used to represent different levels of constellation. When 2's complement arithmetic is employed, the slicing function is effectively reduced to substitution of the least significant bit of the current QAM constellation by a logical value of "1". Such substitution, in turn, reduces hardware complexity of the slicer 16. The input data is in Q3.13 format. The output is also in Q3.13 format. Since the input is in Q3.13 format, optimally, the integer part should be empty. The signal is in the [−1,1] range.

Figure 7:
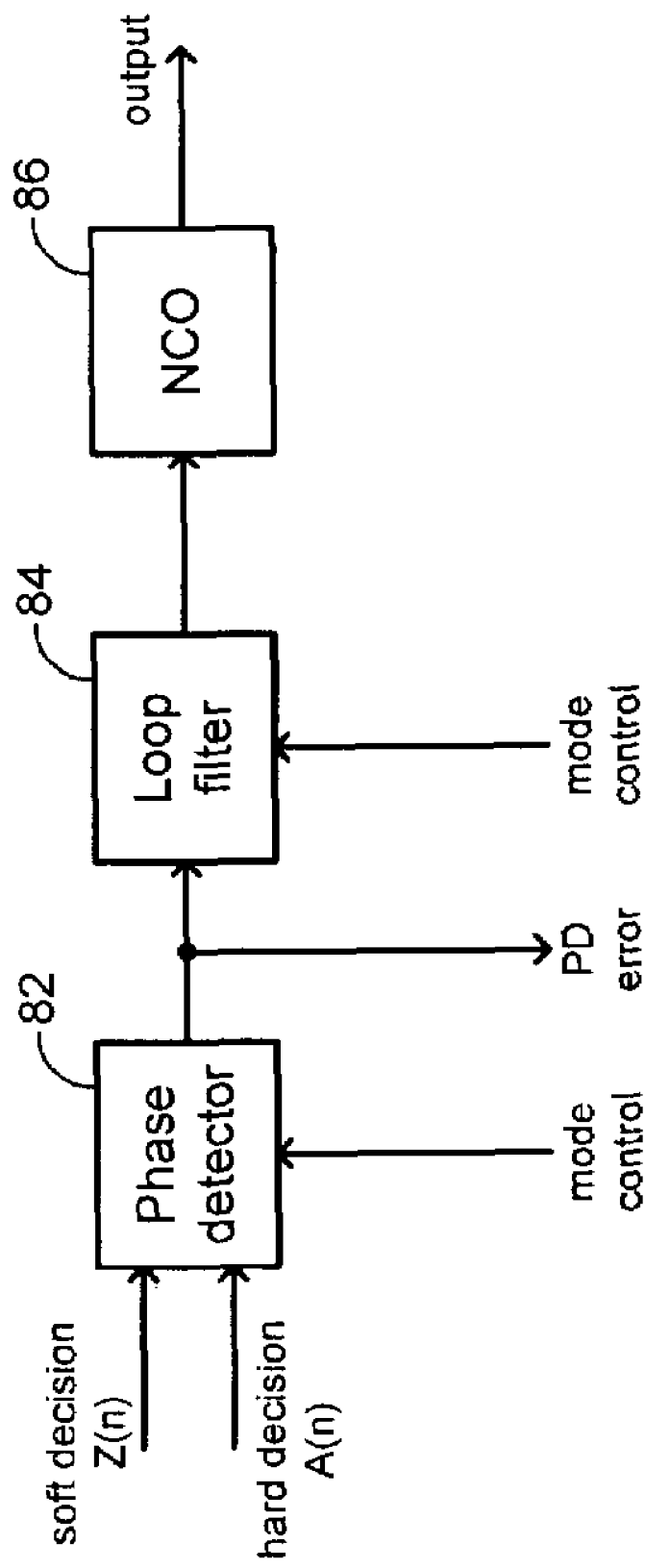
FIG. 7 is a simplified diagram illustrating an exemplary embodiment of a carrier recovery module according to the present invention.

As described above, carrier recovery is designed to remove the frequency offset in the received signal. FIG. 7 is a simplified diagram illustrating an exemplary embodiment of a carrier recovery module 22. As described above, the carrier recovery module 22 is part of the Carrier Recovery Circuit. As shown in FIG. 7, the carrier recovery module 22 is based on a standard phase-lock scheme and includes a phase detector 82, a loop filter 84, and a numerically controlled oscillator (NCO) 86.

In addition to the carrier acquisition and tracking functions described earlier, the output of the phase detector 82 is used as a control signal to control switching between operating modes of the Equalization Circuit and the Carrier Recovery Circuit. In one exemplary implementation, an externally enabled 9-bit counter is used in the control block 24. Each time the absolute value of $\epsilon_{PD}$ exceeds zero ("0"), the counter is incremented. At the same time if $|\epsilon_{PD}|$ exceeds the current predetermined threshold $\epsilon_{thi}$, the counter is reset to the value zero ("0"). Alternatively, if the counter reset does not occur in a predetermined time period or a predetermined number of non-zero phase detector output samples, e.g., five hundred and eleven (511) samples, the counter indicates integer overflow. As a result, the control block 24 switches the Equalization Circuit and the Carrier Recovery Circuit to the next operating mode accordingly, while resetting the counter back to zero ("0") and switching to track a new predetermined threshold corresponding to the current operating mode.

In an exemplary application, the present invention is utilized to provide digital adaptive equalization and carrier recovery for multi-channel quadrature amplitude modulation (QAM) demodulators. Based on the disclosure and teachings provided herein, a person of ordinary skill in the art will know of other ways and/or methods to apply the present invention.

It should be understood that the present invention can be implemented in hardware including circuitry, software or a combination of both. Based on the disclosure and teachings provided herein, a person of ordinary skill in the art will know and appreciate the various ways and/or methods that can be used to implement the present invention. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for providing equalization and carrier recovery, comprising:

an equalization circuit configured to provide equalization for a signal, the equalization circuit including a slicer having an input and an output, the equalization circuit having a blind operating mode that does not depend upon the output of the slicer and a decision-based operating mode that depends at least in part upon the output of the slicer; and a carrier recovery circuit configured to provide carrier recovery for the signal and evaluate the input and output of the slicer to generate a phase detection error based on the evaluation, the carrier recovery circuit having a polarity-based operating mode and decision-based operating mode; wherein:

the equalization circuit and the carrier recovery circuit operate in a concurrent manner to provide equalization and carrier recovery for the signal;

the equalization circuit and the carrier recovery circuit are responsive to a set of signals directing one or both of them to switch operating mode depending on a set of conditions relating to the phase detection error wherein the equalization circuit switches operating mode in response to at least one condition in the set of conditions and the carrier recovery circuit switches operating mode in response to at least one condition in the set of conditions; and the set of conditions includes at least one requirement that the absolute value of the phase detection error remain below a predetermined threshold for a predetermined time interval or for a predetermined number of non-zero sampled values of the phase detection signal.

2. The system of claim 1 further comprising:

a control module configured to implement at least one of the set of conditions that control the equalization circuit and the carrier recovery circuit, the control module comprising a counter, wherein:

a non-zero value of the phase detection error is used to increment the counter;

upon the absolute value of the phase detection error exceeding a predetermined threshold, the counter is reset; and upon the counter reaching a predetermined limit due to the counter being incremented a predetermined number of times without being reset, the control module directs the equalization circuit and/or the carrier recovery circuit to switch operating modes accordingly.

3. A system for providing equalization and carrier recovery, comprising:

an equalization circuit configured to provide equalization for a signal, the equalization circuit including a slicer having an input and an output, the equalization circuit having at least two operating modes; and a carrier recovery circuit configured to provide carrier recovery for the signal and evaluate the input and output of the slicer to generate an evaluation result, the carrier recovery circuit having at least two operating modes; wherein:

the equalization circuit and the carrier recovery circuit operate in a concurrent manner to provide equalization and carrier recovery for the signal;

depending on the evaluation result, the equalization circuit and the carrier recovery circuit are respectively directed to switch operating mode;

the equalization circuit includes at least a first filter having a plurality of coefficients;

each of the plurality of coefficients includes first and second components that are updated based on a first equation that specifies an update of the first component and a second equation that specifies an update of the second component, wherein each equation has first and second updating terms; and for each of the two equations, updating the component for that coefficient uses an approximation wherein:

only the first updating term is used to update its respective component if the absolute value of the second updating term is less than the absolute value of the first updating term, and only the second updating term is used to update its respective component if the absolute value of the first updating term is less than the absolute value of the second updating term.

4. The system of claim 1 wherein the operating modes associated with the equalization circuit and the carrier recovery circuit are switched in response to different conditions of the phase detection error.

5. The system of claim 4 wherein:

the set of conditions of the phase detection error includes first, second, and third subsets of conditions that are respectively characterized by first, second, and third predetermined thresholds for the absolute value of the phase detection error;

upon initial power-up, the equalization circuit engages in its associated blind operating mode;

when the second subset of conditions has been reached, the equalization circuit switches from the blind operating mode to the decision-based operating mode;

upon switching to the decision-based operating mode, the equalization circuit is configured to assume the architecture of a decision-feedback equalizer, the decision-feedback equalizer having a relatively large adaptation step size; and when engaged in the decision-based operating mode and when the third subset of conditions has been reached, the decision-feedback equalizer is switched to a smaller adaptation step size.

6. The system of claim 5 wherein:

the decision-feedback equalizer further includes a plurality of coefficients; and the plurality of coefficients are progressively adapted via Linearly Delayed Least Mean Square algorithm.

7. The system of claim 6 wherein the decision-feedback equalizer is implemented in a transpose form.

8. The system of claim 5 wherein:

when in the blind operating mode, the equalization circuit is configured to assume the architecture of an infinite impulse response (IIR) filter;

the IIR filter includes a plurality of coefficients; and the plurality of coefficients are progressively adapted via Linearly Delayed Constant Modulus Algorithm.

9. The system of claim 5 wherein:

upon initial power-up, the carrier recovery circuit engages in its associated polarity-based operating mode;

upon initially engaging the polarity-based operating mode, the carrier recovery circuit uses a polarity-based phase detector to evaluate the phase difference between the input and output of the slicer;

when in the polarity-based operating mode and when the first subset of conditions has been reached, the carrier recovery circuit adjusts the polarity-based phase detector to a lower loop gain;

when the third subset of conditions has been reached, the carrier recovery circuit switches from the polarity-based operating mode to the decision-based operating mode; and upon entering the decision-based operating mode, the carrier recovery circuit switches to a decision-directed phase detector to evaluate the phase difference between the input and output of the slicer.

10. A system for providing equalization and carrier recovery, comprising:

an equalization circuit configured to provide equalization for a signal, the equalization circuit including a slicer having an input and an output, the equalization circuit having at least two operating modes; and a carrier recovery circuit configured to provide carrier recovery for the signal and evaluate the input and output of the slicer to generate an evaluation result, the carrier recovery circuit having at least two operating modes; wherein:

the equalization circuit and the carrier recovery circuit operate in a concurrent manner to provide equalization and carrier recovery for the signal;

depending on the evaluation result, the equalization circuit and the carrier recovery circuit are respectively directed to switch operating mode;

the slicer includes a register storing a plurality of most significant bits output by the equalization circuit;

combinations of the plurality of most significant bits are used to respectively represent a plurality of quadrature amplitude modulation levels; and the least significant bit of a bit combination output by the equalization circuit is replaced by a logical value of "1" and the bit combination, so modified, is provided as the slicer output.

11. A multi-channel quadrature amplitude modulation demodulator incorporating the system as recited in claim 1.

12. A multi-channel quadrature amplitude modulation (QAM) demodulator comprising:

an equalization circuit configured to provide equalization for a signal, the equalization circuit including a slicer having an input and an output, the equalization circuit having at least two operating modes, a first operating mode that does not depend upon the output of the slicer and a second operating mode that depends at least in part upon the output of the slicer; and a carrier recovery circuit configured to provide carrier recovery for the signal and evaluate the input and output of the slicer to generate a phase detection error, the carrier recovery circuit having at least two operating modes; wherein the equalization circuit and the carrier recovery circuit operate in a concurrent manner to provide equalization and carrier recovery for the signal; and the equalization circuit and the carrier recovery circuit are responsive to a set of signals directing one or both of them to switch operating mode depending on threshold-crossing statistics of the phase detection error wherein the equalization circuit switches operating mode in response to at least one condition in the set of conditions and the carrier recovery circuit switches operating mode in response to at least one condition in the set of conditions.

13. The QAM demodulator of claim 12 wherein:

a control module is configured to respond to the threshold-crossing statistics and thus control the equalization circuit and the carrier recovery circuit, the control module comprising a counter;

a non-zero value of the phase detection error is used to increment the counter;

upon the absolute value of the detection error exceeding a predetermined threshold, the counter is reset; and upon the counter reaching a predetermined limit due to the counter being incremented a predetermined number of times without being reset, the control module directs the equalization circuit and/or the carrier recovery circuit to switch operating modes accordingly.

14. A multi-channel quadrature amplitude modulation (QAM) demodulator for providing equalization and carrier recovery, comprising:

an equalization circuit configured to provide equalization for a signal, the equalization circuit including a slicer having an input and an output, the equalization circuit having at least two operating modes; and a carrier recovery circuit configured to provide carrier recovery for the signal and evaluate the input and output of the slicer to generate a phase detection error, the carrier recovery circuit having at least two operating modes; wherein the equalization circuit and the carrier recovery circuit operate in a concurrent manner to provide equalization and carrier recovery for the signal; and depending on the phase detection error, the equalization circuit and the carrier recovery circuit are respectively directed to switch operating mode;

the equalization circuit includes at least a first filter having a plurality of coefficients;

each of the plurality of coefficients includes first and second components that are updated based on a first equation that specifies an update of the first component and a second equation that specifies an update of the second component, wherein each equation has first and second updating terms; and for each of the two equations, updating the component for that coefficient uses an approximation wherein:

only the first updating term is used to update its respective component if the absolute value of the second updating term is less than the absolute value of the first updating term, and only the second updating term is used to update its respective component if the absolute value of the first updating term is less than the absolute value of the second updating term.

15. The QAM demodulator of claim 12 wherein:

the operating modes associated with the equalization circuit include a blind operating mode and a decision-based operating mode; and the operating modes associated with the carrier recovery circuit include a polarity-based operating mode and decision-based operating mode.

16. The QAM demodulator of claim 15 wherein:

the threshold-crossing statistics of the phase detection error include first, second, and third sets of conditions that are respectively characterized by first, second, and third predetermined thresholds of the phase detection error;

upon initial power-up, the equalization circuit engages in its associated acquisition mode;

when the second set of conditions has been reached, the equalization circuit switches from the blind operating mode to the decision-based operating mode;

upon switching to the decision-based operating mode, the equalization circuit is configured to assume the architecture of a decision-feedback equalizer, the decision-feedback equalizer having a relatively large adaptation step size; and when engaged in the decision-based operating mode and when the third set of conditions has been reached, the decision-feedback equalizer is switched to a smaller adaptation step size.

17. A multi-channel quadrature amplitude modulation (QAM) demodulator for providing equalization and carrier recovery, comprising:

an equalization circuit configured to provide equalization for a signal, the equalization circuit including a slicer having an input and an output, the equalization circuit having at least two operating modes, a first operating mode that does not depend upon the output of the slicer and a second operating mode that depends at least in part upon the output of the slicer; and a carrier recovery circuit configured to provide carrier recovery for the signal and evaluate the input and output of the slicer to generate a phase detection error, the carrier recovery circuit having at least two operating modes; wherein
the equalization circuit and the carrier recovery circuit operate in a concurrent manner to provide equalization and carrier recovery for the signal;
depending on the phase detection error, the equalization circuit and the carrier recovery circuit are respectively directed to switch operating mode;
in one of its operating modes, the equalization circuit is configured to assume the architecture of a decision-feedback equalizer;
the decision-feedback equalizer includes a plurality of coefficients; and
the plurality of coefficients are progressively adapted via Linearly Delayed Least Mean Square algorithm.

18. The QAM demodulator of claim 17 wherein the decision-feedback equalizer is implemented in a transpose form.

19. A multi-channel quadrature amplitude modulation (QAM) demodulator for providing equalization and carrier recovery, comprising:
an equalization circuit configured to provide equalization for a signal, the equalization circuit including a slicer having an input and an output, the equalization circuit having at least two operating modes, a first operating mode that does not depend upon the output of the slicer and a second operating mode that depends at least in part upon the output of the slicer; and
a carrier recovery circuit configured to provide carrier recovery for the signal and evaluate the input and output of the slicer to generate a phase detection error, the carrier recovery circuit having at least two operating modes; wherein:
the equalization circuit and the carrier recovery circuit operate in a concurrent manner to provide equalization and carrier recovery for the signal;
depending on the phase detection error, the equalization circuit and the carrier recovery circuit are respectively directed to switch operating mode;
in one of its operating modes, the equalization circuit is configured to assume the architecture of an infinite impulse response (IIR) filter;
the IIR filter includes a plurality of coefficients; and
the plurality of coefficients are progressively adapted via Linearly Delayed Constant Modulus Algorithm.

20. The QAM demodulator of claim 16 wherein:
upon initial power-up, the carrier recovery circuit engages in its associated polarity-based operating mode;
upon initially engaging the polarity-based operating mode, the carrier recovery circuit uses a polarity-based phase detector to evaluate the phase difference between the input and output of the slicer;
when in the polarity-based operating mode and when the first set of conditions has been reached, the carrier recovery circuit adjusts the polarity-based phase detector to a lower loop gain;
when the third set of conditions has been reached, the carrier recovery circuit switches from the polarity-based operating mode to the decision-based operating mode; and
upon entering the decision-based operating mode, the carrier recovery circuit switches to a decision-directed phase detector to evaluate the phase difference between the input and output of the slicer.

21. A multi-channel quadrature amplitude modulation (QAM) demodulator for providing equalization and carrier recovery, comprising:
an equalization circuit configured to provide equalization for a signal, the equalization circuit including a slicer having an input and an output, the equalization circuit having at least two operating modes; and
a carrier recovery circuit configured to provide carrier recovery for the signal and evaluate the input and output of the slicer to generate a phase detection error, the carrier recovery circuit having at least two operating modes; wherein
the equalization circuit and the carrier recovery circuit operate in a concurrent manner to provide equalization and carrier recovery for the signal;
depending on the phase detection error, the equalization circuit and the carrier recovery circuit are respectively directed to switch operating mode;
the slicer includes a register storing a plurality of most significant bits output by the equalization circuit;
combinations of the plurality of most significant bits are used to respectively represent a plurality of quadrature amplitude modulation levels; and
the least significant bit of a bit combination output by the equalization circuit is replaced by a logical value of "1"; and
the bit combination, so modified, is provided as the slicer output.

22. A method for providing equalization and carrier recovery, comprising:
configuring an equalization circuit to provide equalization for a signal, the equalization circuit including a slicer having an input and an output, the equalization circuit having two operating modes, a first operating mode that does not depend upon the output of the slicer and a second operating mode that depends at least in part upon the output of the slicer;
configuring a carrier recovery circuit to provide carrier recovery for the signal and evaluate the input and output of the slicer to generate an evaluation result, the carrier recovery circuit having two operating modes;
operating the equalization circuit and the carrier recovery circuit in a concurrent manner to provide equalization and carrier recovery for the signal;
evaluating the evaluation result;
monitoring one or more properties of the phase detection error over time; and
directing the equalization circuit and the carrier recovery circuit respectively to switch operating mode based on a signal that represents the phase detection error meeting a threshold condition for a specified interval.

23. A method for providing equalization and carrier recovery, comprising:
configuring an equalization circuit to provide equalization for a signal, wherein
the equalization circuit includes a slicer having an input and an output,
the equalization circuit has at least two operating modes, and
the equalization circuit includes at least a first filter having a plurality of coefficients with each of the plurality of coefficients including first and second components;
configuring a carrier recovery circuit to provide carrier recovery for the signal and evaluate the input and output of the slicer to generate an evaluation result, the carrier recovery circuit having at least two operating modes;

operating the equalization circuit and the carrier recovery circuit in a concurrent manner to provide equalization and carrier recovery for the signal;

evaluating the evaluation result;

directing the equalization circuit and the carrier recovery circuit respectively to switch operating mode based on the evaluation result;

updating each of the plurality of coefficients based on a first equation that specifies an update of the first component and a second equation that specifies an update of the second component, wherein each equation has first and second updating terms; and for each of the two equations, using an approximation to update the component for that coefficient wherein:

only the first updating term is used to update its respective component if the absolute value of the second updating term is less than the absolute value of the first updating term, and only the second updating term is used to update its respective component if the absolute value of the first updating term is less than the absolute value of the second updating term.

24. The method of claim 22 wherein the two operating modes associated with equalization circuit and the carrier recovery circuit are an acquisition mode and a tracking mode.

25. The method of claim 24 further comprising:

upon initial power-up, directing the equalization circuit to engage in its associated acquisition mode;

when the evaluation result indicates that a second predetermined threshold has been reached, directing the equalization circuit to switch from the acquisition mode to the tracking mode;

upon switching to the tracking mode, configuring the equalization circuit to assume the architecture of a decision-feedback equalizer, the decision-feedback equalizer having a relatively large adaptation step size; and when engaged in the tracking mode and when the evaluation result indicates that a third predetermined threshold has been reached, switching the decision-feedback equalizer to a smaller adaptation step size.

26. A method for providing equalization and carrier recovery, comprising:

configuring an equalization circuit to provide equalization for a signal, the equalization circuit including a slicer having an input and an output, the equalization circuit further having at least two operating modes, a first operating mode that does not depend upon the output of the slicer and a second operating mode that depends at least in part upon the output of the slicer;

configuring a carrier recovery circuit to provide carrier recovery for the signal and evaluate the input and output of the slicer to generate an evaluation result, the carrier recovery circuit having at least two operating modes;

operating the equalization circuit and the carrier recovery circuit in a concurrent manner to provide equalization and carrier recovery for the signal;

evaluating the evaluation result;

directing the equalization circuit and the carrier recovery circuit respectively to switch operating mode based on the evaluation result;

in at least one operating mode, configuring the equalization circuit to assume the architecture of a decision-feedback equalizer, the decision-feedback equalizer having a plurality of coefficients; and progressively adapting the plurality of coefficients via Linearly Delayed Least Mean Square algorithm.

27. The method of claim 26 wherein the decision-feedback equalizer is implemented in a transpose form.

28. The method of claim 25 further comprising:

when in the acquisition mode, configuring the equalization circuit to assume the architecture of an infinite impulse response (IIR) filter, wherein the IIR filter includes a plurality of coefficients; and progressively adapting the plurality of coefficients in a linearly delayed manner based on the Constant Modulus Algorithm.

29. The method of claim 25 further comprising:

upon initial power-up, directing the carrier recovery circuit to engage in its associated acquisition mode;

upon initially engaging the acquisition mode, directing the carrier recovery circuit to use a polarity-based phase detector to evaluate the phase difference between the input and output of the slicer;

when in the acquisition mode and when the evaluation result indicates that a first predetermined threshold has been reached, directing the carrier recovery circuit to adjust the polarity-based phase detector to a lower loop gain;

when the evaluation result indicates that the third predetermined threshold has been reached, directing the carrier recovery circuit to switch from the acquisition mode to the tracking mode; and upon entering the tracking mode, directing the carrier recovery circuit to switch to a decision-directed phase detector to evaluate the phase difference between the input and output of the slicer.

30. A method for providing equalization and carrier recovery, comprising:

configuring an equalization circuit to provide equalization for a signal, the equalization circuit including a slicer having an input and an output, the equalization circuit further having two operating modes, wherein the slicer includes a register storing a plurality of most significant bits output by the equalization circuit;

configuring a carrier recovery circuit to provide carrier recovery for the signal and evaluate the input and output of the slicer to generate an evaluation result, the carrier recovery circuit having two operating modes;

operating the equalization circuit and the carrier recovery circuit in a concurrent manner to provide equalization and carrier recovery for the signal;

evaluating the evaluation result; and directing the equalization circuit and the carrier recovery circuit respectively to switch operating mode based on the evaluation result;

using combinations of the plurality of most significant bits to respectively represent a plurality of quadrature amplitude modulation levels;

replacing the least significant bit of a bit combination output by the equalization circuit by a logical value of "1"; and providing the bit combination, so modified, as the slicer output.

31. A multi-channel quadrature amplitude modulation demodulator utilizing the method as recited in claim 22.

32. The system of claim 1 further comprising:

a control module configured to implement at least one of the set of conditions that control the equalization circuit and the carrier recovery circuit, the control module comprising a counter, wherein:

a non-zero value of the phase detection error is used to increment the counter;

upon the absolute value of the phase detection error exceeding a predetermined threshold, the counter is reset; and upon a predetermined time limit elapsing without the counter being reset, the control module directs the equalization circuit and/or the carrier recovery circuit to switch operating modes accordingly.

33. The QAM demodulator of claim 12 wherein:
a control module is configured to respond to the threshold-crossing statistics and thus control the equalization circuit and the carrier recovery circuit, the control module comprising a counter;

a non-zero value of the phase detection error is used to increment the counter;

upon the absolute value of the detection error exceeding a predetermined threshold, the counter is reset; and upon a predetermined time limit elapsing without the counter being reset, the control module directs the equalization circuit and/or the carrier recovery circuit to switch operating modes accordingly.

* * * * *